Nov. 13, 1962     P. F. DOUGHERTY     3,063,246
UNDERGROUND STORAGE OF HYDROCARBONS
Filed May 29, 1959
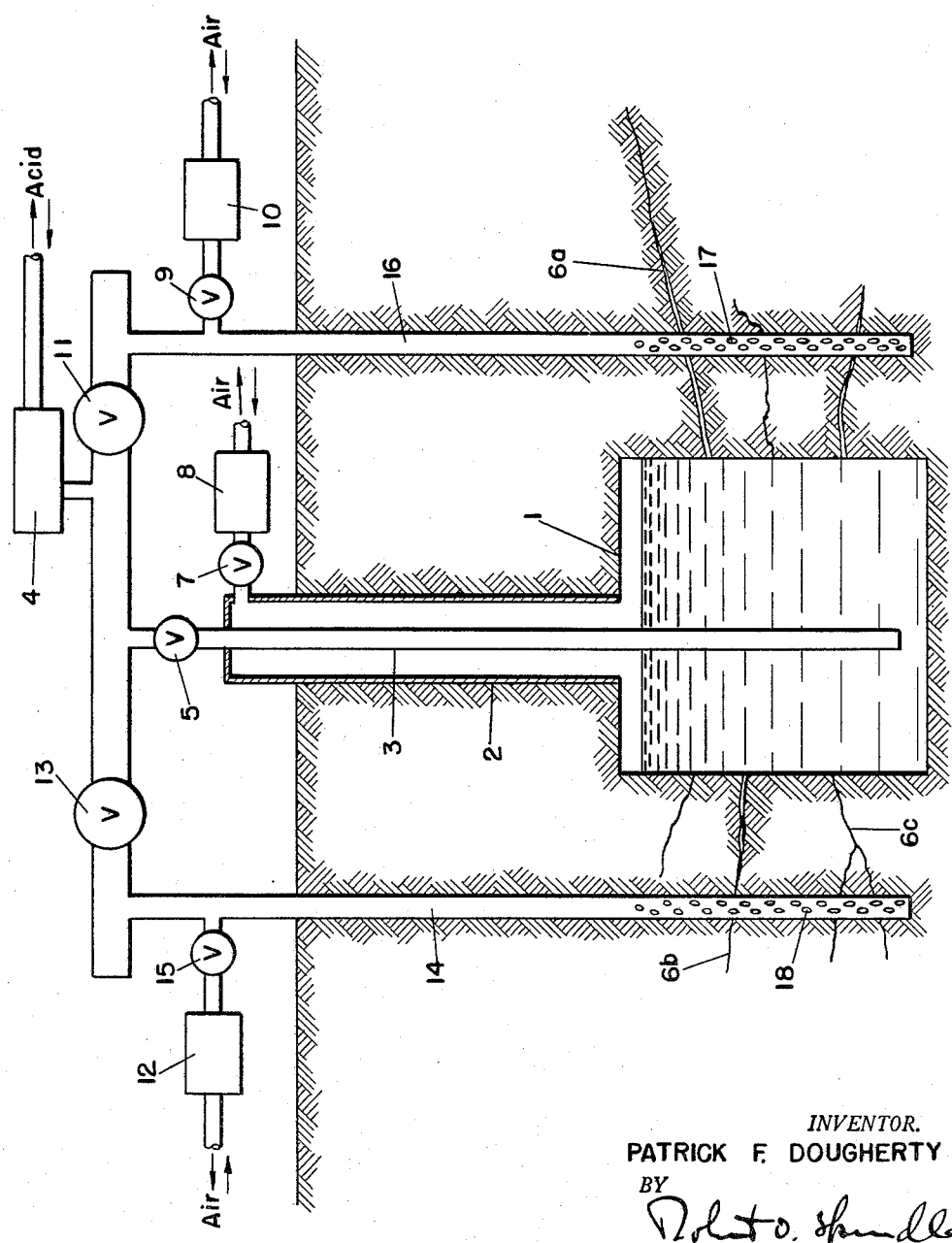
INVENTOR.
PATRICK F. DOUGHERTY
BY
ATTORNEY

United States Patent Office 3,063,246
Patented Nov. 13, 1962

3,063,246
UNDERGROUND STORAGE OF HYDRO-
CARBONS
Patrick F. Dougherty, Chester Heights, Pa., assignor to Sun Oil Company, Philadelphia, Pa., a corporation of New Jersey
Filed May 29, 1959, Ser. No. 816,776
8 Claims. (Cl. 61—.5)

This invention relates to storage of hydrocarbons in artificial underground caverns.

Various types of underground storage facilities are presently used to store gas and oil. These may be broadly grouped into those which are lined with some material such as metal, wood or a layer of concrete or plastic film and those which are unlined.

Storage of large volumes of fluid hydrocarbons directly against rock, without a lining of any kind, is a comparatively recent technique. Examples of the unlined group are salt cavities, depleted oil and gas reservoirs, quarries and mined reservoirs.

Underground storage has been used for a variety of hydrocarbon types such as propane, butane, crude oils and heating oils.

The present invention is particularly directed to the mined reservoir. This type of storage is popular because it can be visually constructed and inspected. The rock walls of the cavern must be impermeable or be capable of being made impermeable. The caverns are mined in rock formations of the massive or sedimentary form.

It has been found that while in use some of the caverns develop leaks in strata containing calcite (calcium carbonate). These leaks cause considerable loss of the stored fluid. Calcite occurs in rock formations in massive form as limestones, chalk, marls, oolites and other sedimentary deposits of variable structure, grain size and porosity. Some of these are earthy, mealy crusts which are permeable and friable. They tend to crumble and erode away when in contact with the hydrocarbon fluid. Others maintain their form but are so porous that fluid passes through them continually.

In accordance with the present invention the drained cavern is treated with dilute sulfuric acid to convert the calcite to calcium sulfate particles. Calcium sulfate has a low chemical reactivity in comparison with the carbonate and is insoluble in water and hydrocarbons. The particles migrate along the calcite streaks and agglomerate and pack together to form an impervious plug.

In a further embodiment holes are drilled around the periphery of the cavern and sulfuric acid is injected into the subsurface formation. The holes are two to eight inches in diameter. The leaking areas can be located by visual inspection of the walls of the empty cavern. The acid is injected under slight pressure and percolates into the area surrounding the drilled hole. As the calcium sulfate is formed, it agglomerates and forms the desired insoluble plug. This treatment may be made separately or in conjunction with the treatment within the cavern.

A detailed description of the invention is presented in the following paragraphs:

In accordance with the invention an aqueous solution of sulfuric acid together with a suitable corrosion inhibitor is fed into the empty cavern until the strata containing the calcite streaks is covered. The acid concentration of the aqueous solution is less than 25%, preferably 5% to 15% by volume. The acid is pumped in at ambient temperature. The acid solution leaks through the calcite streaks and reacts to form insoluble calcium sulfate. The acid is kept in contact with the rock walls of the cavern for a time sufficient to completely permeate the calcite streaks and complete the desired reaction. The time will depend upon the permeability of the strata and the head of acid solution above the strata. It may vary from a few hours to several days.

The drawing is a vertical section which schematically illustrates treatment from within the cavern alone or in conjunction with treatment through peripheral drill holes. The cavern 1 is located at any suitable depth from the surface. Shaft 2 extends from the surface to the top of the cavern. It is large enough to permit the entry of men and materials. Pipe 3 extends from the surface to a point just above the cavern floor. Sulfuric acid is pumped by pump 4 through open valve 5 into the cavern until the desired level has been attained. The acid seeps into the cracks shown generally at 6a, 6b, and 6c. Back pressure may be maintained on the acid surface by manipulation of valve 7 which allows the air above the acid surface to be compressed to any desired degree. It is important that the pressure on the cavern walls be maintained at approximately one pound per square inch per foot of depth, measured from the ground surface, to prevent hydrofracturing of the formation; a range of .75 to 1.5 pounds per square inch per foot of depth measured from the ground surface is preferred. After a sufficient time has elapsed to complete the formation of the calcium sulfate the acid is withdrawn by means of pump 4. Air may be pumped by pump 8 into the shaft 2 as a means of increasing the acid flow back up the pipe 3. Valves 5, 7, 9, 11, 13 and 15 are open or closed as necessary.

Reference numerals 14 and 16 denote drill holes with or without casing. If casing is used, it will be suitably perforated as shown at 17 and 18 in the sections which are opposite the areas containing the calcite streaks as shown. Packers are attached to the outside of the casing to form a seal. Acid is pumped into drill holes 14 and 16 by pump 4 or other suitable independent pumping arrangements, which will be apparent to those skilled in the art. If desired acid may be pumped into the drill holes for a time to partially fill the drill hole after which air may be used, by operating pumps 10 and 12. Valves are open or closed as necessary. This method of operation has the advantage of providing the acid at the desired point only while maintaining the proper pressure.

The method of the present invention is superior to ordinary surface coating operations which have been applied directly to the walls of rock caverns in that the treating material travels back into the strata and performs its sealing effect there rather than sealing only at the rock face of the cavern. When holes are drilled around the periphery of the cavern the present process permits treatment in close proximity to the calcite streaks utilizing a small quantity of acid. Where the situation requires it, both embodiments of the present invention can be employed at the same time with the consequent advantages of each being realized.

I claim:

1. A process for sealing calcite streaks which penetrate an unlined underground cavern comprising the steps of removing hydrocarbon fluid from the cavern, pumping a solution consisting essentially of aqueous sulfuric acid into the cavern in amounts sufficient to cover the streaks and cause the acid to permeate into the streaks, maintaining the solution in contact with the streaks for a time sufficient to convert calcite to insoluble calcium sulfate particles which migrate and agglomerate within the streaks in the form of a plug, removing the excess acid from the cavern, and refilling it with hydrocarbon fluid.

2. The process according to claim 1 in which the acid concentration is 5% to 15% by volume.

3. The process according to claim 1 in which the temperature is ambient and the pressure along the cavern wall is in the range of from .75 to 1.5 pounds per square inch per foot of depth.

4. A process for sealing calcite streaks which penetrate an unlined underground cavern comprising the steps of pumping a solution consisting essentially of aqueous sulfuric acid into a series of spaced drill holes penetrating the calcite streaks so that the drill holes communicate with the cavern through the streaks in amounts sufficient to cover the streaks and cause the acid to permeate into the streaks, and maintaining the solution in contact with the streaks for a time sufficient to convert the calcite to insoluble calcium sulfate particles which migrate and agglomerate within the streaks in the form of a plug.

5. The process according to claim 4 in which the acid concentration is 5% to 15% by volume.

6. The process according to claim 4 in which the temperature is ambient and the pressure along the cavern wall is in the range of from .75 to 1.5 pounds per square inch per foot of depth.

7. A process for sealing calcite streaks which penetrate an unlined underground cavern from which the contents have been removed comprising simultaneously pumping a solution consisting essentially of aqueous sulfuric acid into the cavern and into a series of spaced drill holes penetrating the calcite streaks in amounts sufficient to cover the streaks and cause the acid to permeate into the streaks from both the cavern and the drill holes and maintaining the solution in contact with the streaks for a time sufficient to convert the calcite to insoluble calcium sulfate particles which migrate and agglomerate within the streak in the form of a plug.

8. The process according to claim 7 in which the acid concentration is 5% to 15% by volume, the temperature is ambient and the pressure along the cavern wall is in the range of from .75 to 1.5 pounds per square inch per foot of depth.

References Cited in the file of this patent

UNITED STATES PATENTS

| | | |
|---|---|---|
| 829,664 | Mehner | Aug. 28, 1906 |
| 2,065,512 | Cannon | Dec. 29, 1936 |
| 2,803,114 | Hudson | Aug. 20, 1957 |

OTHER REFERENCES

Industrial and Engineering Chemistry vol. 31, No. 11, Nov. 1939, page 1368.